United States Patent
Li et al.

(10) Patent No.: US 10,210,415 B2
(45) Date of Patent: *Feb. 19, 2019

(54) METHOD AND SYSTEM FOR RECOGNIZING INFORMATION ON A CARD

(71) Applicant: Alipay.com Co., Ltd, Hangzhou (CN)

(72) Inventors: Yang Li, Hangzhou (CN); Guo Chen, Hangzhou (CN)

(73) Assignee: Alipay.com Co., Ltd (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,060

(22) Filed: Mar. 1, 2016

(65) Prior Publication Data

US 2016/0247037 A1    Aug. 25, 2016

Related U.S. Application Data

(63) Continuation of application No. 14/292,288, filed on May 30, 2014, now Pat. No. 9,367,753.

(30) Foreign Application Priority Data

Jun. 3, 2013   (CN) .......................... 2013 1 0216611

(51) Int. Cl.
*G06K 9/20*   (2006.01)
*G06K 9/32*   (2006.01)
(Continued)

(52) U.S. Cl.
CPC .......... *G06K 9/325* (2013.01); *G06K 9/2054* (2013.01); *G06T 5/003* (2013.01); *G06K 2209/01* (2013.01)

(58) Field of Classification Search
None
See application file for complete search history.

(56) References Cited

U.S. PATENT DOCUMENTS 4,454,506 A * 6/1984 Netravali ................. G09G 5/02
                                                                345/589
5,351,314 A   9/1994 Vaezi
(Continued)

FOREIGN PATENT DOCUMENTS

CN       1684097      10/2005
CN     201159903      12/2008
(Continued)

OTHER PUBLICATIONS

Baxes, Digital Image Processing: principles and applications, published by John Wiley & Sons, Inc., 1994, pp. 86-88 and 362.
(Continued)

*Primary Examiner* — Feng Niu
(74) *Attorney, Agent, or Firm* — Van Pelt, Yi & James LLP

(57) ABSTRACT

Embodiments of the present application relate to a method for recognizing information, a system for recognizing information, and a computer program product for recognizing information. A method for recognizing information is provided. The method includes locating a card zone for each frame within a card image frame sequence comprising a plurality of frames, locating an information zone within each card zone, dividing each information zone into at least one character zone, de-blurring a character zone corresponding to a same region across all the frames in the card image frame sequence, and recognizing character string information based on the de-blurred character zone.

14 Claims, 7 Drawing Sheets

(51) Int. Cl.
*G06T 5/00* (2006.01)
*G06K 9/34* (2006.01)

(56) References Cited

U.S. PATENT DOCUMENTS

| | | | |
|---|---|---|---|
| 5,887,192 A | 3/1999 | Nishio | |
| 6,853,984 B1 | 2/2005 | Wilkes | |
| 7,505,604 B2 | 3/2009 | Zakrzewski | |
| 7,756,357 B2* | 7/2010 | Yoneyama | G06K 9/00127 359/368 |
| 7,826,665 B2* | 11/2010 | Bressan | G06K 9/03 382/181 |
| 8,374,432 B2* | 2/2013 | Yamakawa | H04N 1/40062 358/2.1 |
| 9,367,753 B2* | 6/2016 | Li | G06K 9/325 |
| 2005/0002587 A1* | 1/2005 | Yoneyama | G06K 9/00127 382/254 |
| 2005/0219581 A1* | 10/2005 | Dobashi | G06K 9/38 358/1.9 |
| 2006/0008147 A1* | 1/2006 | Jung | G06K 9/2054 382/176 |
| 2007/0013795 A1* | 1/2007 | Sakamoto | H04N 5/23203 348/266 |
| 2007/0019248 A1 | 1/2007 | Ho | |
| 2007/0122039 A1* | 5/2007 | Zhang | G06K 9/38 382/199 |
| 2007/0133874 A1* | 6/2007 | Bressan | G06K 9/03 382/181 |
| 2009/0173784 A1 | 7/2009 | Yang | |
| 2009/0234773 A1 | 9/2009 | Hasson | |
| 2009/0288011 A1* | 11/2009 | Piran | G08B 13/19693 715/720 |
| 2009/0324068 A1* | 12/2009 | Yamakawa | H04N 1/40 382/165 |
| 2010/0231733 A1 | 9/2010 | Dobashi | |
| 2010/0246961 A1 | 9/2010 | Prasad | |
| 2011/0058232 A1* | 3/2011 | Matsuoka | H04N 1/00002 358/474 |
| 2011/0164284 A1* | 7/2011 | Dai | H04N 1/4072 358/3.06 |
| 2012/0098930 A1* | 4/2012 | Yamaguchi | H04N 13/139 348/43 |
| 2013/0004076 A1 | 1/2013 | Koo | |
| 2013/0204777 A1 | 8/2013 | Irwin | |
| 2014/0006423 A1* | 1/2014 | Melnychenko | G06F 17/3053 707/749 |
| 2014/0052636 A1 | 2/2014 | Mattes | |
| 2015/0002672 A1* | 1/2015 | Hayakawa | B60R 1/00 348/148 |

FOREIGN PATENT DOCUMENTS

| | | |
|---|---|---|
| CN | 101510258 | 2/2013 |
| EP | 1796019 | 6/2007 |
| JP | 2005037902 | 2/2005 |
| JP | 2010191909 | 9/2010 |
| KR | 20100083966 | 7/2010 |

OTHER PUBLICATIONS

Neo et al. "Real-time online multimedia content processing: mobile video optical character recognition and speech synthesizer for the visual impaired." Proceedings of the 1st international convention on Rehabilitation engineering & assistive technology: in conjunction with 1st Tan Tock Seng Hospital Neurorehabilitation Meeting. ACM, 2007.

* cited by examiner

METHOD AND SYSTEM FOR RECOGNIZING INFORMATION ON A CARD

CROSS REFERENCE TO OTHER APPLICATIONS

This application is a continuation of co-pending U.S. patent application Ser. No. 14/292,288, entitled METHOD AND SYSTEM FOR RECOGNIZING INFORMATION ON A CARD filed May 30, 2014 which is incorporated herein by reference for all purposes, which claims priority to People's Republic of China Patent Application No. 201310216611.5 entitled INFORMATION RECOGNITION METHOD, EQUIPMENT AND SYSTEM, filed Jun. 3, 2013 which is incorporated herein by reference for all purposes.

FIELD OF THE INVENTION

The present application relates to a method and a system for recognizing information.

BACKGROUND OF THE INVENTION

As the Internet develops, online payment, cell phone payment, and other express payments have become increasingly widespread. Commonly, bank card users directly enter their card information. To increase the speed of input, users are sometimes using image-capturing equipment to acquire bank card information and auxiliary information.

Many applications on the market today are capable of collecting single-frame images, processing the single-frame images to obtain areas of interest, and then performing image processing and optical character recognition on the obtained areas of interest. Collected bank card images have problems including, for example, motion blurring and noise due to limitations of photosensitive elements of the image-capturing equipment and effects from the environment. Avoiding poor quality of captured images is difficult for the system, and thus positioning the card zone within the image is also difficult for the system. In some instances, some character zones on the card are clear, while other character zones on the card are fuzzy. If a current single-frame processing method, which processes uniformly without distinguishing between conditions, is employed, some characters may be recognized correctly, while some characters cannot be easily recognized and can even fail to be recognized.

BRIEF DESCRIPTION OF THE DRAWINGS

Various embodiments of the invention are disclosed in the following detailed description and the accompanying drawings.

The drawings described here are intended to further the understanding of the present application and form a part of this application. The exemplary embodiments of the present application and the descriptions thereof are intended to explain this application and do not constitute inappropriate limitation of the present application. Among the drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method for introducing an original single-frame image processing process into multi-frame image sequences is provided. With an image-capturing device such as a camera on a portable terminal, the image-capturing device performs video stream sampling or multi-image sampling on a standard card, such as a bank card or an identification card from which one's information is collected. Then, the image-capturing device separately performs de-blurring on character zones in a plurality of frames of the sampled video stream or a plurality of images, filters out character zones which are not suitable for recognition from the plurality of frames, and saves and combines the character zones which are suitable for recognition to obtain character string information recognition results for the same card. In some embodiments, card information is quickly, conveniently, and accurately input into an application interface in the portable terminal.

Figure 1A:
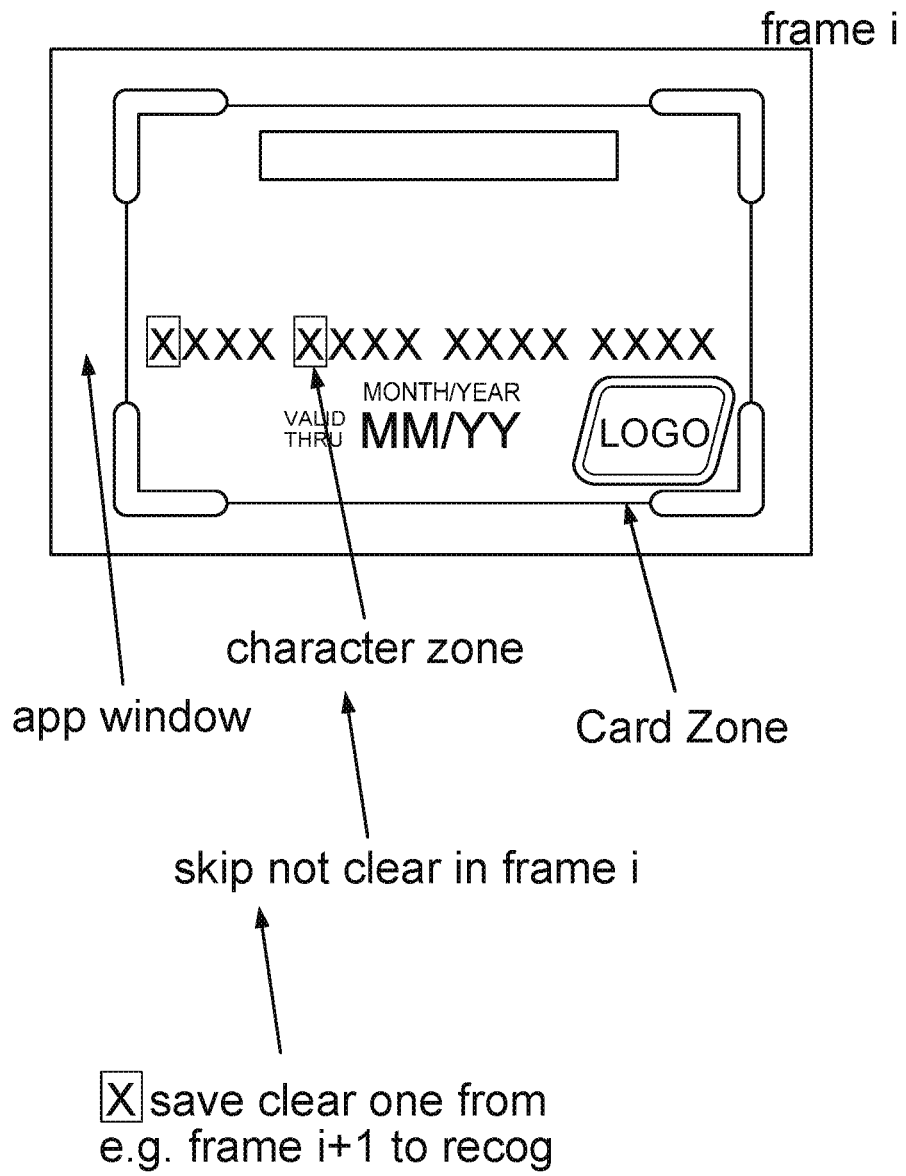
FIG. 1A is a diagram of an example of a card zone.

FIG. 1A is a diagram of an example of a card zone. The card zone refers to a rectangular area of an image. The image can be located within an app window. The four sides of the rectangular area correspond to four sides of a card. In some embodiments, the technique uses a plurality of frames to filter and obtain clear characters and then performs recognition to obtain character string information. For example, if a character in a character zone is not clear or blurry in a first frame, e.g., frame i, the character in frame i can be skipped and the character in the same character zone in a next frame, e.g., frame i+1, can be used if the character is clear.

Figure 1B:
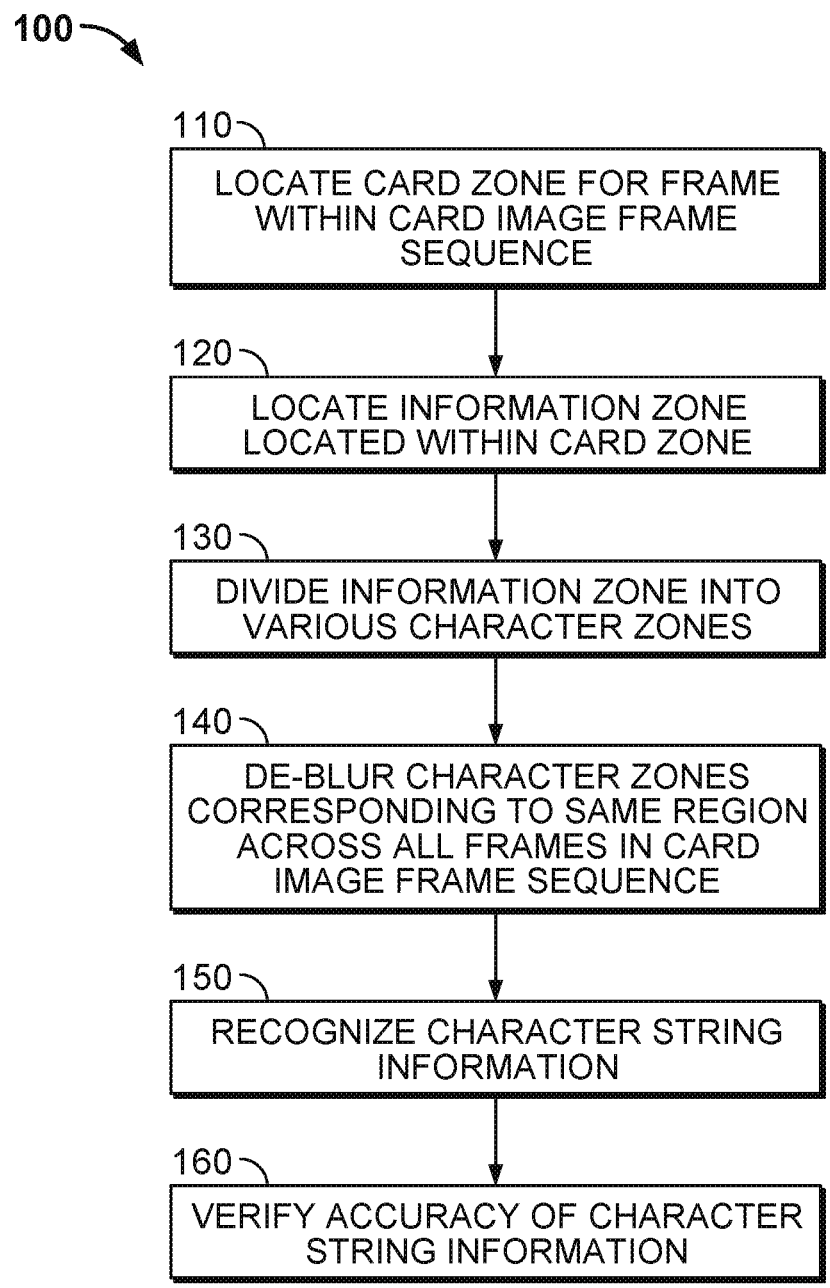
FIG. 1B is a flowchart of an embodiment of a process for recognizing information.

FIG. 1B is a flowchart of an embodiment of a process for recognizing information. In some embodiments, the process 100 is implemented by a server or information recognition equipment 720 of FIG. 7 and comprises:

In some embodiments, when a user makes an online payment through a portable terminal, such as a portable computer, a palmtop computer, or a cell phone, and is to enter bank card information such as a card number or an expiration date, the user recognizes and inputs the bank card information via an image-capturing device, such as a camera on a portable terminal.

In one example, the user captures a video stream of a bank card via an image-capturing device (e.g., by using a video capturing application), or the user captures a plurality of single-frame images of a bank card with an image-capturing device (e.g., by taking multiple photos). In another example, the user captures both a plurality of single-frame images and a video stream of a bank card with an image-capturing device.

In some embodiments, a user stores the captured plurality of single-frame images and/or the video stream in a cache of the image-capturing device or the portable terminal and the server acquires an image frame sequence from the cache for later performing image analysis.

In 110, the server locates a card zone for each frame within a card image frame sequence.

In some embodiments, the image frame sequence corresponds with a set of single-frame images from a plurality of image captures (e.g., a plurality of photos), or the image frame sequence has been selected from a continuous video stream from within the cache (e.g., a portion of a video stream). In some embodiments, the image frame sequence includes a preset number of continuous frames, or the image frame sequence corresponds to a preset number of non-continuous frames selected at intervals of a predetermined number of frames. As an example, the non-continuous frames correspond to one frame out of every three frames. In some embodiments, the number of frames in the image frame sequence varies according to specific implementations. For example, the number of frames in the image frame sequence does not exceed ten. In another example, the number of frames in the image frame sequence is three or five.

In some embodiments, the card zone is located within each frame based on any known locating technique. Examples of known locating techniques include object detection based on statistical studies, object detection based on template matching, etc. In some embodiments, the card zone is located within each frame in an image frame sequence based on a predetermined shape, a predetermined size, a feature unique to the card face, or any combination thereof.

For example, bank cards are produced based on international standards. The bank cards have a standard size and shape, and character information such as card number and expiration date have relatively fixed positions on the card. In addition, the character information has a specific format. Therefore, the card zone can be located in the image frames based on the positions of these characteristics. In some embodiments, the server first locates the card zone and then locates numerical zones.

In some embodiments, while performing card zone position analysis, if the current frame is assessed through visual measurements to be insufficiently sharp or the card zone cannot be located, the server discards the current frame, acquires the next frame from the cache, and performs the analysis on the acquired next frame. For example, sharpness of the frame is calculated using a Brenner gradient, the calculated frame sharpness can be compared to a threshold, and if the calculated frame sharpness exceeds the threshold, the frame is determined to be sufficiently sharp.

The server can locate card zones in image frames using any suitable approach, including approaches known in the art or to be developed in the future, in addition to the approach described in the aforesaid embodiment.

In 120, the server locates at least one information zone located within each card zone.

In some embodiments, the server locates an information zone within the located card zone based on the following characteristics: a preset position of the information zone in the card, a preset size of the information zone, a preset shape of the information zone, or any combination thereof. The information zone includes, for example, a card number zone, an expiration date zone, a cardholder name zone, a security code zone, any other type of information that appears on the card, or any combination thereof.

As an example, the bank cards are produced according to international standards, as mentioned above. For example, relative positions of information zones such as the card number and the expiration date are fixed on the card face, and these information zones have a specific shape. Using a card that is 87 mm×55 mm as an example, the upper left corner of the card is assigned to be the origin, the length of the card is the X axis, and the height of the card is the Y axis. Typically, numbers appear around 10*30 mm in a region 68 mm in length and 5 mm in height. Therefore, the server locates the information zones in card zone images based on these above characteristics.

The server can locate information zones in card zones based on any suitable approach, whether known to the art or to be developed in the future, in addition to the approach described in the aforesaid embodiment.

In 130, the server divides each information zone into various character zones.

In some embodiments, the server divides a located information zone into at least one character zone based on the following characteristics: character spacing, a number of characters, a character size, or any combination thereof, in the information zone. For example, a character zone includes one numerical character or a letter character.

In some embodiments, the server divides an information zone into at least one character zone using any suitable approach, whether known to the art or to be developed in the future, in addition to the approach described in the aforesaid embodiment. For example, the server employs a threshold value segmentation method which is well known in the art, and subjects the information zone to foreground and background segmentation, thresholding, and classifier pattern classification to divide the information zone into at least one character zone.

As an example, to divide an information zone, the server first obtains a gradient image of the information zone, projects the pre-divided gradient image to a horizontal line where gray scale values accumulate, and identifies clear divisions of regions or character zones on the horizontal line.

In 140, the server de-blurs the character zones corresponding to the same region across all frames in the card image frame sequence.

In some embodiments, in the division operation, an information zone in each frame in the image frame sequence is divided into at least one character zone. Because the same number of character zones is included in each frame, character zones that have the same position or sequence number in each frame are defined as corresponding character zones. The sequence number provides a fixed serial number to a particular position of a character zone, and the serial number does not change in the sequence of frames. For example, a first character zone in each frame is a corresponding character zone, a second character zone in each frame is a corresponding character zone, a third character zone in each frame is a corresponding character zone, etc.

In some embodiments, the server saves images of the corresponding character zones in all frames in a same-vector data structure. Suppose that an information zone on a card face has N characters and that the number of frames in the frame sequence is M. In this example, the number of vectors in the data structure corresponds to N, and the number of vector dimensions corresponds to M.

In some embodiments, to increase image recognition accuracy, the server de-blurs at least one character zone corresponding across all the frames in the image frame sequence.

For example, the server can use any de-blurring method, whether already known or to be developed in the future, to de-blur the various corresponding character zones. Examples of de-blurring methods include using a Wiener filter, a Richardson-Lucy algorithm, etc.

Figure 2:
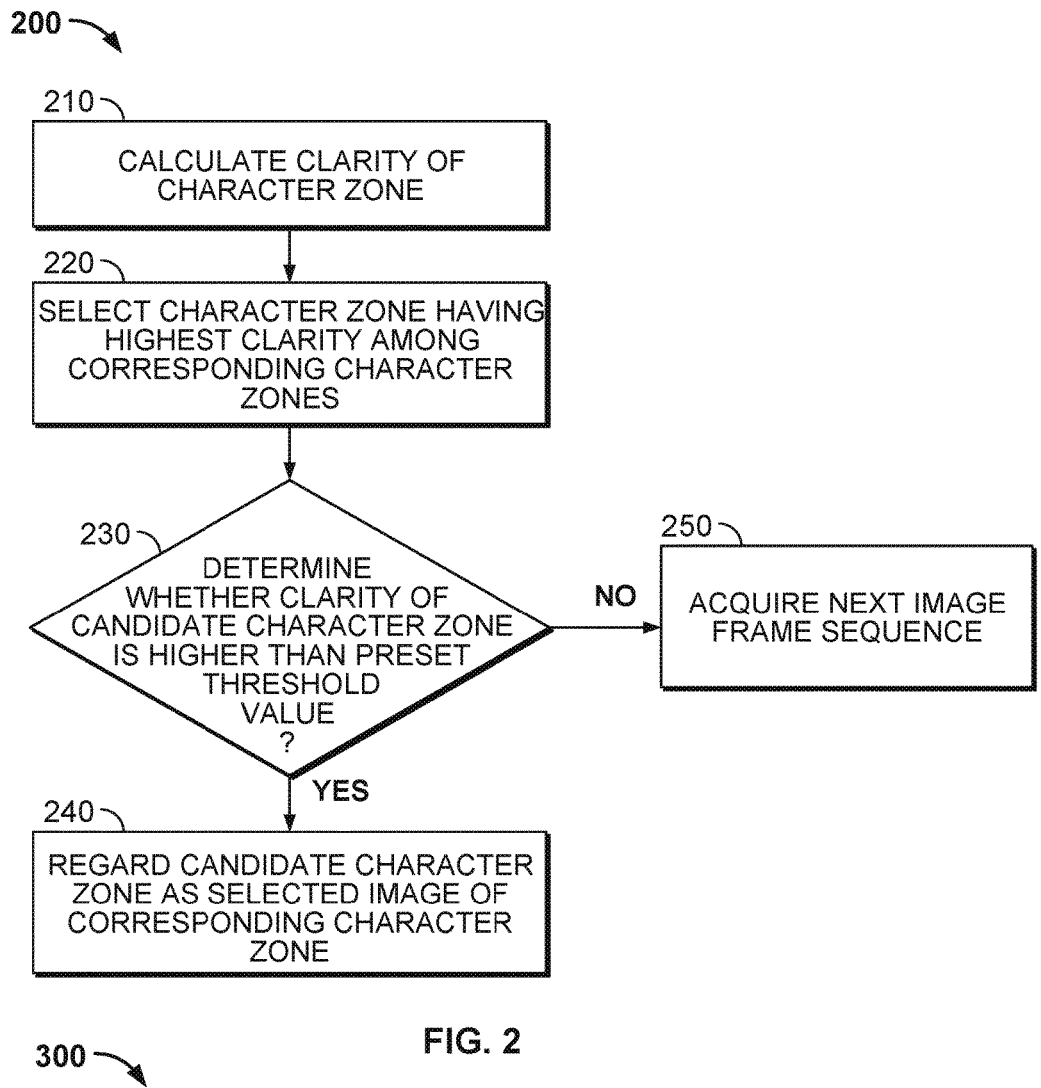
FIG. 2 is a flowchart of an embodiment of a process for de-blurring a character zone.

FIG. 2 is a flowchart of an embodiment of a process for de-blurring a character zone. In some embodiments, the process 200 is an implementation of 140 of FIG. 1B and comprises:

In 210, for character zones corresponding to all the frames in the image frame sequence, the server calculates a clarity of each character zone that represents how clear, sharp, and/or legible the character zone is deemed to be.

In some embodiments, the server computes the clarity of each character zone among the corresponding character zones across all frames. In fact, in some embodiments, the server can use any suitable method for calculating image sharpness to calculate the clarity of the character zones. For example, image sharpness can be calculated using a Brenner gradient.

Figure 3:
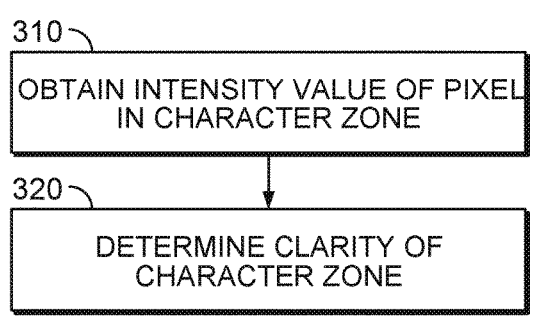
FIG. 3 is a flowchart of an embodiment of a process for calculating a clarity of a character zone.

In some embodiments, the server calculates clarities of character zones based on greyscale values of pixels in the character zones. FIG. 3 is a flowchart of an embodiment of a process for calculating a clarity of a character zone. In some embodiments, the process 300 is an implementation of 210 of FIG. 2 and comprises:

Typically, characters on bank cards have characteristics that are non-flat, stamped, and raised. Strokes in the characters are typically in two directions: horizontal and vertical. Diagonal strokes in the characters appear relatively rare, and radii of connecting corner angles between horizontal and vertical strokes are relatively small. These characteristics indicate that projected images of the bank card characters have exceptionally marked gradient features in horizontal and vertical directions. The gradient features represent a rate of change in an image in a horizontal or vertical direction. Using, as an example, a first set of three neighboring pixels with greyscale values of (0.1, 0.5, 0.9) in comparison with a second set of three neighboring pixels with greyscale values of (0.3, 0.3, 0.3), the first set of pixels has greater gradient features than the second set of pixels. Therefore, the character zone clarities are described using the horizontal and vertical gradient features of the greyscale values of the pixels in the character zones.

In 310, the server obtains an intensity value of each pixel in a character zone based on horizontal and vertical gradient features of each pixel within the character zone.

As an example, the server scans each pixel in the character zone based on a predetermined character intensity test operator set, obtains the horizontal and vertical gradient features of the greyscale value of each pixel based on the results of the scanning, and then obtains the intensity values of all the pixels in the character zone.

In some embodiments, the character intensity test operator set is defined as follows: T={a,b}. In some embodiments, parameter a is a parameter used to extract and scan horizontal gradient features in the character zone, and parameter b is a parameter used to extract and scan vertical gradient features in the character zone, and a and b are both 3×3 matrices. Each element in the matrices corresponds to a pixel in an image. An example of an arrangement of the matrix elements corresponds to an arrangement of pixels in the image, as shown below.

$$a = \begin{bmatrix} -0.5 & -0.5 & -0.5 \\ 1.0 & 1.0 & 1.0 \\ -0.5 & -0.5 & -0.5 \end{bmatrix} \quad b = \begin{bmatrix} -0.5 & 1.0 & -0.5 \\ -0.5 & 1.0 & -0.5 \\ -0.5 & 1.0 & -0.5 \end{bmatrix}$$

In some embodiments, in the scanning process, parameter a is used in conducting horizontal scans and parameter b is used in vertical scans, and the horizontally-scanned values and the vertically-scanned values are summed to obtain intensity values for all pixels. For example, while conducting a horizontal scan, each element in matrix a is multiplied by the greyscale value of the corresponding pixel, and the products of each element and the greyscale value of the corresponding pixel are summed. The resulting sum relates to the intensity value of the pixel corresponding to the element in the matrix central position. In addition, if, during the calculations, the server encounters pixels positioned on an edge of an image, the server supplements the pixels to complete the calculations, and the greyscale values of the supplemented pixels are set to zero. Vertical scan processing is similar to horizontal scan processing and will not be discussed further for conciseness.

A test operator set T is an example and does not limit the present invention. The parameters a and b in the operator set T can also be any other suitable values.

In some embodiments, the intensity values of the pixels in the character zones are effectively described in the processing described above. The intensity values are used to determine clarity. In addition, the server can effectively use the horizontal and vertical gradient features of greyscale values of the pixels to reflect the clarities of the character zones. In addition, relatively few operators are involved in the processing described above, and calculation efficiency is increased as a result.

In 320, the server determines the clarity of each character zone based on the intensity values.

In some embodiments, for each character zone, the server calculates the mean of the intensity values of all the pixels in a character zone as the clarity for the character zone.

Thus, in operations 310 and 320, the server determines the clarity of each character zone. Although an example of a bank card is used here in which a clarity standard is determined for indented and/or raised characters, the clarity standard and the schemes are not limited to indented and/or raised characters, but also apply to situations where flat characters exist.

Referring back to FIG. 2, in 220, the server selects a character zone having the highest clarity among the corresponding character zones and determines the character zone having the highest clarity to serve as a candidate character zone.

In an example, the server individually calculates a clarity for a character zone of each frame within a frame sequence and thus obtains a set of clarities of the corresponding character zones in the frame sequence. From the set of clarities, the server selects the character zone with the highest clarity as a candidate character zone.

In 230, the server determines whether the clarity of the candidate character zone is higher than a preset threshold value. In some embodiments, the preset threshold value is empirically determined.

In 240, in the event that the clarity of the candidate character zone is higher than the preset threshold value, the server regards the candidate character zone as the selected image of the corresponding character zone for subsequent recognition processing.

In 250, in the event that the clarity of the candidate character zone is not higher than the preset threshold value, the server acquires the next image frame sequence and continues processing the next image frame sequence.

As an example, another frame sequence is obtained from the cache and information recognition is performed again by executing the information recognition process 100 of FIG. 1B. In some embodiments, the other frame sequence has the same number of frames as the previously processed frame sequence.

At this point, all the character zones have been de-blurred via operations 210 to 250. In some embodiments, the multiple frames are selected sequentially from a video stream, or several frames are selected at intervals. As an aspect, in some embodiments, in view of the time data similarity between adjacent frames, a plurality of single frames are selected at intervals of several frames and are called critical frames. This approach can result in a lower data computing volume than for consecutive selection, and the approach can effectively increase computing efficiency and increase overall system performance.

In addition, as for the selection of the number of frames and the selection of the character clarity threshold value, the server can, by taking the selected images for all N character zones whose character clarities satisfy the threshold value requirement as the standard, determine the number of frames and the character clarity threshold value by weighing the two based on the operating conditions of the information recognition system. In other words, when, in one card information recognition process, the server has acquired M frames and obtained the selected images of all N character zones having a clarity that is greater than a clarity threshold value, the server does not need to acquire any more frames. In addition, in some embodiments, the server also selects M frames during the next card information recognition. In some embodiments, the number M cannot be too large. If the number M is too large, the overall performance of the system suffers and users will have long waits. For example, if, during a recognition process, the server is not able with ten frames to acquire the selected images for N character zones that satisfy the requirements, then the server appropriately lowers the character clarity threshold value to acquire N sharp character zones within ten frames in the next recognition process. The process is not intended to limit M to ten or a specific number. Instead, M can be greater than this number or less than ten.

Referring back to FIG. 1B, in 150, the server recognizes character string information based on the de-blurred character zones.

In some embodiments, the server sequentially recognizes corresponding characters in the selected images of all the character zones based on any known recognition technique and thereby obtains the character string information. For example, the server employs a threshold value segmentation method which is commonly employed in the art, and recognizes the corresponding characters through foreground and background segmentation, thresholding, and classifier pattern classification. An example of the recognizing of the character string information includes using machine learning techniques to train an identification engine to recognize numerals 0-9, and then using the identification engine to recognize each character.

By subjecting multi-frame image processing results to fusion processing and thus obtaining sharp character zone images which are suitable for subsequent recognition processing, card information recognition accuracy rates are increased as well as the performance of overall card information recognition systems resulting in increased user convenience. An example fusion processing can be found in process 300 of FIG. 3.

Please note that all of the above embodiments use bank cards as an example. However, the schemes are not limited to bank cards, and can be applied to various standard cards that comply with standards, such as identification cards, membership cards, etc.

In some embodiments, in 160, after the character string information is recognized, the server verifies an accuracy of the character string information.

In some embodiments, the recognized character string information is verified according to a predetermined rule for the card. In some embodiments, in the event that the recognized character string information is verified, the server performs subsequent processing, for example, the character string information is displayed as card information to users to be confirmed. In some embodiments, in the event that the recognized character string information is not verified, the server acquires the next image frame sequence and information recognition is performed again using the process 100 of FIG. 1B.

Using a bank card as an example, in the event that the recognized character zone is a card number information zone, the server verifies the character string information that is recognized to comply with a predetermined rule, for example, the predetermined number of digits or a predetermined arrangement of a number series, for bank card numbers in international standards.

Through the verification operation, the process increases accuracy rates of card information recognition, overall card information recognition system performance, and user convenience.

Figure 4:
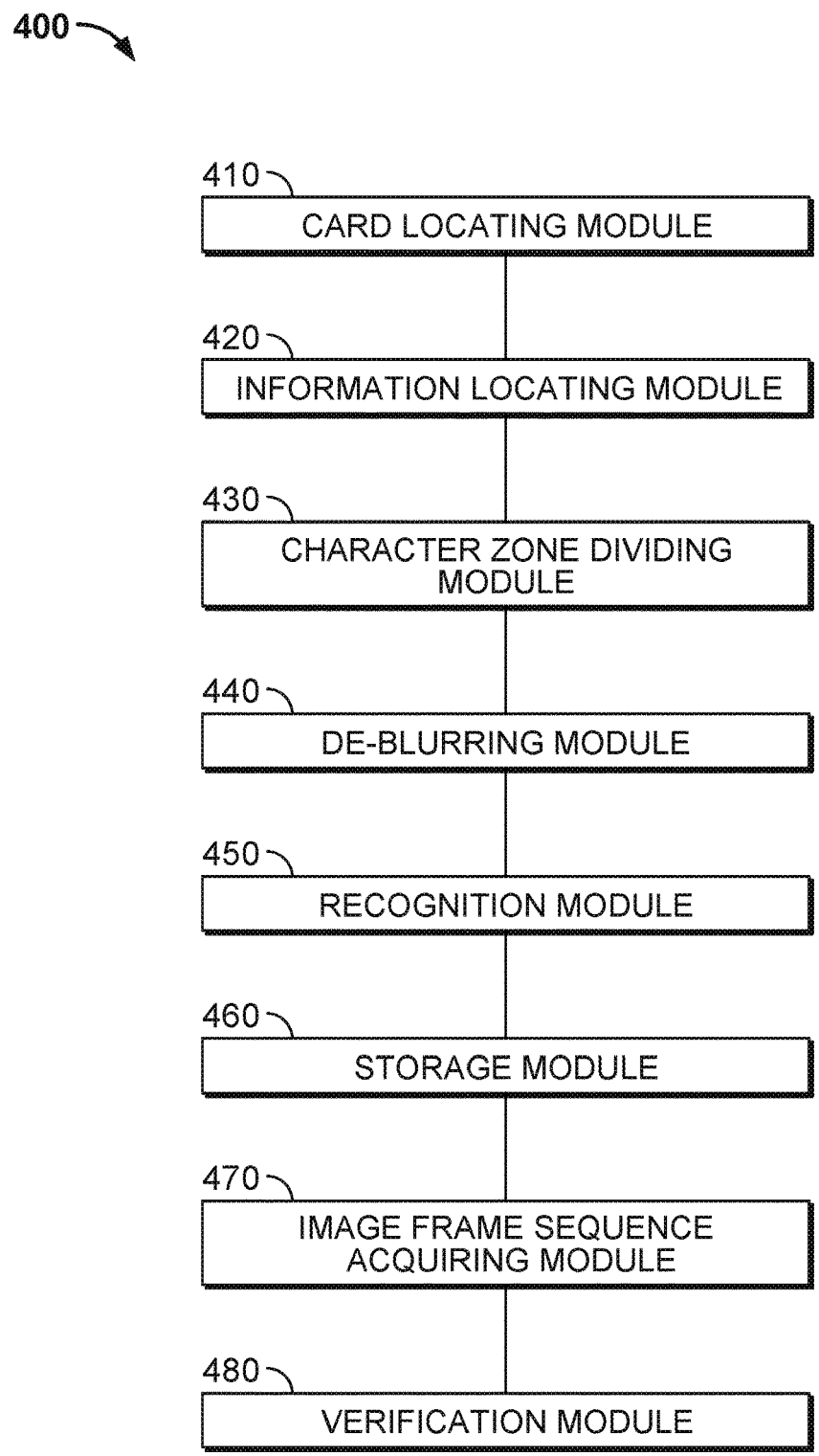
FIG. 4 is a structural block diagram of an embodiment of a device for recognizing information.

FIG. 4 is a structural block diagram of an embodiment of a device for recognizing information. In some embodiments, the device 400 implements the process 100 of FIG. 1B and comprises a card locating module 410, an information locating module 420, a character zone dividing module 430, a de-blurring module 440, and a recognition module 450.

In some embodiments, the card locating module 410 locates a card zone for each frame within a card image frame sequence. As an example, the card locating module 410 locates the card zone within each frame using any known locating technique. In some embodiments, the card locating module 410 locates the card zone within image frames based on the following characteristics: a predetermined shape, a predetermined size, a feature unique to character information, or any combination thereof.

In some embodiments, the information locating module 420 individually locates an information zone within each card zone. In some embodiments, the information locating module 420 further locates the information zone within each card zone based on the following characteristics: a preset position of an information zone in the card, a preset size of an information zone, a preset shape of an information zone, or any combination thereof. For example, information zones include a card number zone, an expiration date zone, a cardholder name zone, etc.

In some embodiments, the character zone dividing module 430 divides each information zone into various character zones. In some embodiments, the character dividing module 430 divides an information zone into at least one character zone based on the following characteristics: character spacing, number of characters, character size, or any combination thereof, in the information zone. For example, a character zone includes a number or a letter.

In some embodiments, the de-blurring module 440 de-blurs corresponding character zones across all the frames in an image frame sequence. In some embodiments, the de-blurring module 440, whether already known or to be developed in the future, de-blurs all the corresponding character zones.

Figure 5:
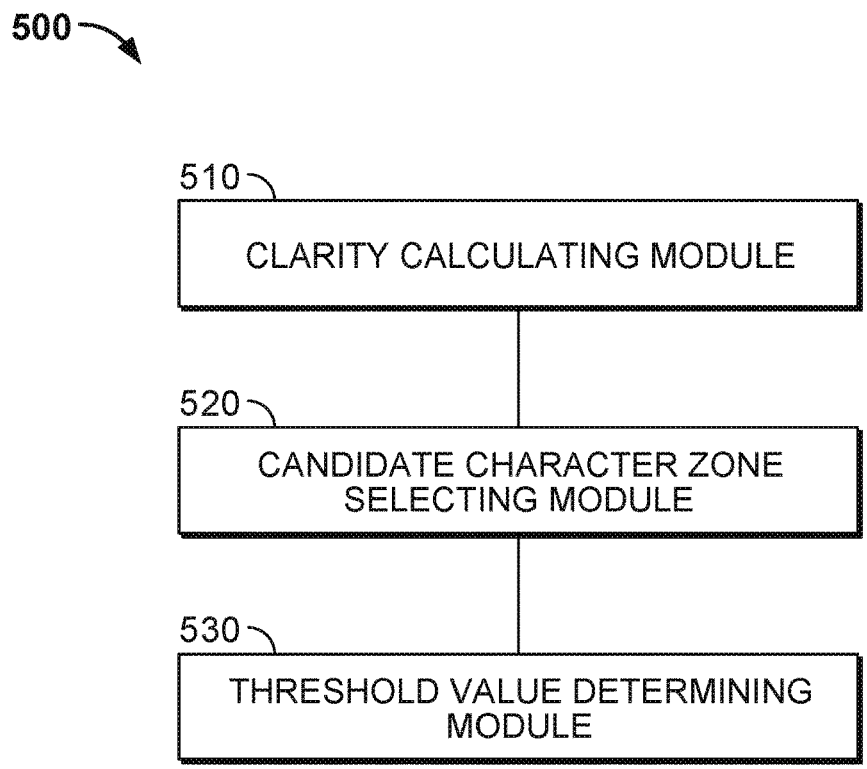
FIG. 5 is a structural block diagram of an embodiment of a de-blurring module.

FIG. 5 is a structural block diagram of an embodiment of a de-blurring module. In some embodiments, the de-blurring module 500 is an implementation of the de-blurring module 440 of FIG. 4 and comprises a clarity calculating module 510, a candidate character zone selecting module 520, and a threshold value determining module 530.

In some embodiments, the clarity calculating module 510 calculates clarity of each character zone for character zones corresponding across all the frames in the image frame sequence.

Figure 6:
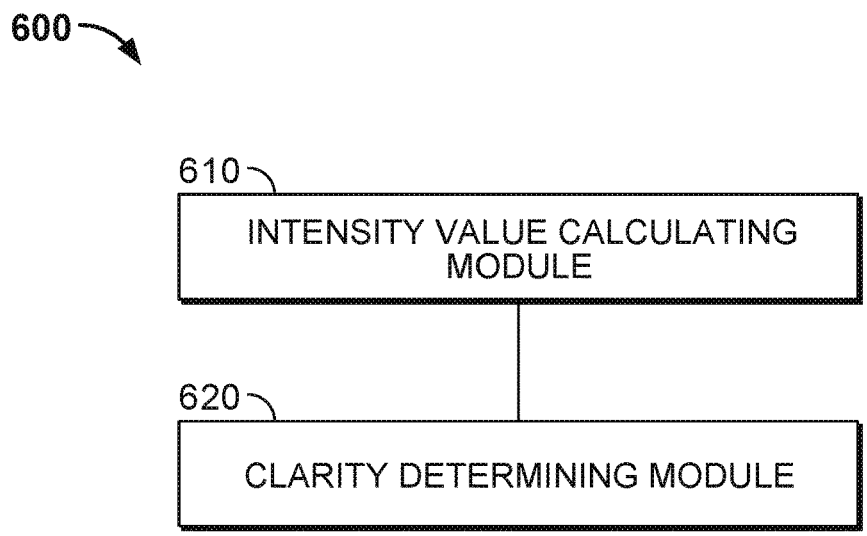
FIG. 6 is a structural block diagram of an embodiment of a clarity calculating module.

FIG. 6 is a structural block diagram of an embodiment of a clarity calculating module. In some embodiments, the clarity calculating module 600 is an implementation of the clarity calculating module 510 of FIG. 5 and comprises an intensity value calculating module 610 and a clarity determining module 620.

In some embodiments, the intensity value calculating module 610 calculates an intensity value of each pixel in a character zone based on horizontal and vertical gradient features of each pixel within the character zone.

In some embodiments, the clarity determining module 620 determines the clarity of each character zone according to the intensity value of each pixel in the character zone.

Referring back to FIG. 5, in some embodiments, the candidate character zone selecting module 520 selects the character zone having the highest clarity among the corresponding character zones and has the selected character zone serve as a candidate character zone.

In some embodiments, in the event that the clarity of the candidate character zone is higher than a preset threshold value, the threshold value determining module 530 regards the candidate character zone as the selected image of the corresponding character zone for subsequent recognition processing. In the event that the clarity of the candidate character zone is lower than the preset threshold value, the threshold value determining module 530 acquires the next image frame sequence and continues processing the next image frame sequence.

Referring back to FIG. 4, in some embodiments, the recognition module 450 recognizes character string information based on the de-blurred character zones.

So far, a schematic structure of information recognition equipment has been described. By subjecting multi-frame image processing results to fusion processing and thus obtaining sharp character zone images which are suitable for subsequent recognition processing, card information recognition accuracy rates and the performance of overall card information recognition systems can be increased, with increased user convenience.

In some embodiments, the device 400 comprises a storage module 460 and an image frame sequence acquiring module 470.

In some embodiments, the storage module 460 stores, in a cache, a video stream or a plurality of single-frame images taken of a card.

In some embodiments, the image frame sequence acquiring module 470 acquires the image frame sequence from the cache.

In some embodiments, the image frame sequence acquiring module 470 selects various frames in the image frame sequence at intervals of a certain number of frames from a continuous video stream in the cache.

In some embodiments, the device 400 comprises a verification module 480.

In some embodiments, the verification module 480 verifies an accuracy of character string information on a card face. In some embodiments, the verification module 480 verifies whether character string information complies with a predetermined rule for the card. In the event that the character string information complies with a predetermined rule for the card, the verification module 480 displays the character string information as card information to be confirmed by the user. In the event that the character string information does not comply with a predetermined rule for the card, the verification module 480 acquires the next image frame sequence and continues processing the next image frame sequence. Through verification, accuracy rates of card information recognition, overall card information recognition system performance, and user convenience are increased.

Figure 7:
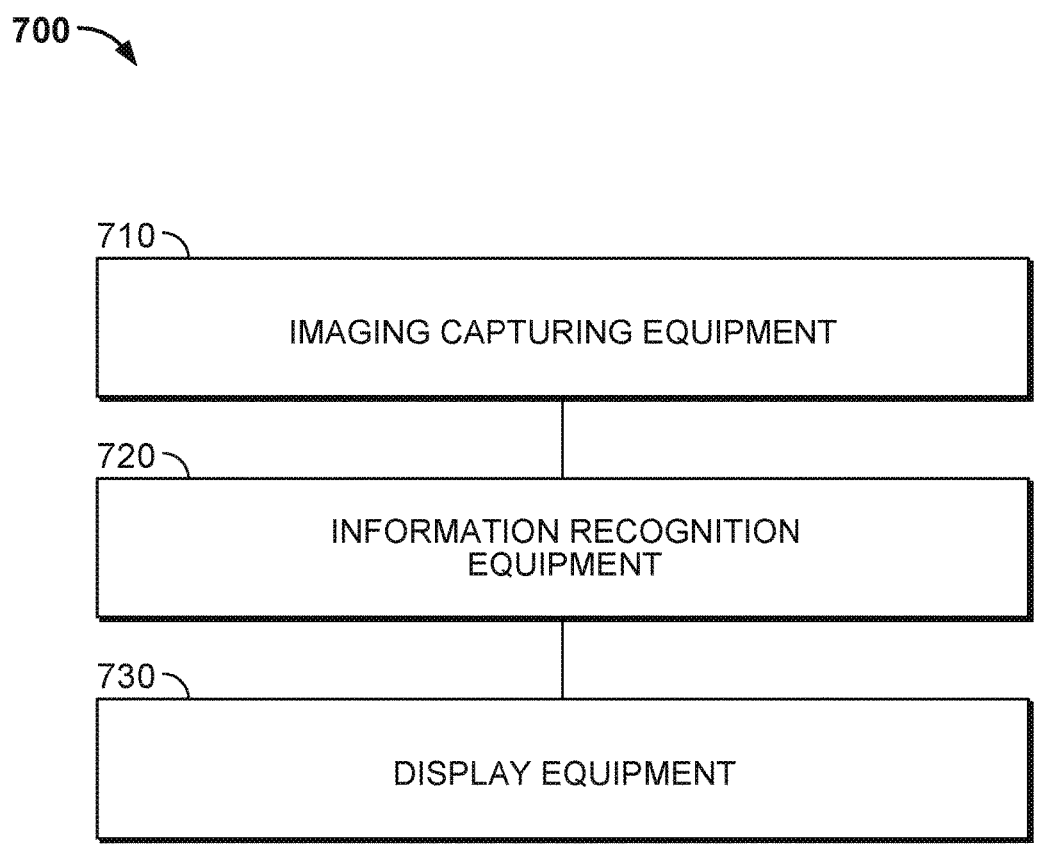
FIG. 7 is a structural block diagram of an embodiment of a system for recognizing information.

FIG. 7 is a structural block diagram of an embodiment of a system for recognizing information. In some embodiments, the system 700 comprises imaging capturing equipment 710, information recognition equipment 720, and display equipment 730.

In some embodiments, the image capturing equipment 710 acquires a card image frame sequence. For example, the image capturing equipment 710 is an image acquisition device such as an internal or external camera or a scanner attached to a portable terminal. This image capturing equipment 710 is capable of shooting a video stream of a card or taking a plurality of image samples of the card and thus obtains a plurality of single-frame images. In this way, the image capturing equipment 710 acquires the card image frame sequence.

In some embodiments, the information recognition equipment or a server 720 recognizes card-face character string information in a card image frame sequence. In some embodiments, the information recognition equipment 720 recognizes the card-face character string information in card zones and recognizes the card zones in a card image frame sequence captured by the image capturing equipment 710. In some embodiments, the information recognition equipment 720 corresponds to the device 400 of FIG. 4.

In some embodiments, the display equipment 730 displays the character string information recognized by the information recognition equipment 720. In some embodiments, the display equipment 730 receives the character string information output by the information recognition equipment 720 and displays the character string information to the user to be confirmed.

In some embodiments, the information recognition system 700 uses the image capturing equipment 710 to capture the card image frame sequence, subjects the character zone image processing results of the plurality of frames to fusion processing, and recognizes the combined character zone images. In this way, the information recognition system 700 extracts the card-face character string information. Because the information recognition system 700 performs multi-frame fusion processing, the information recognition system 700 can increase card information recognition accuracy rates, increase the performance of the overall card information recognition system, and increase user convenience.

Figure 8:
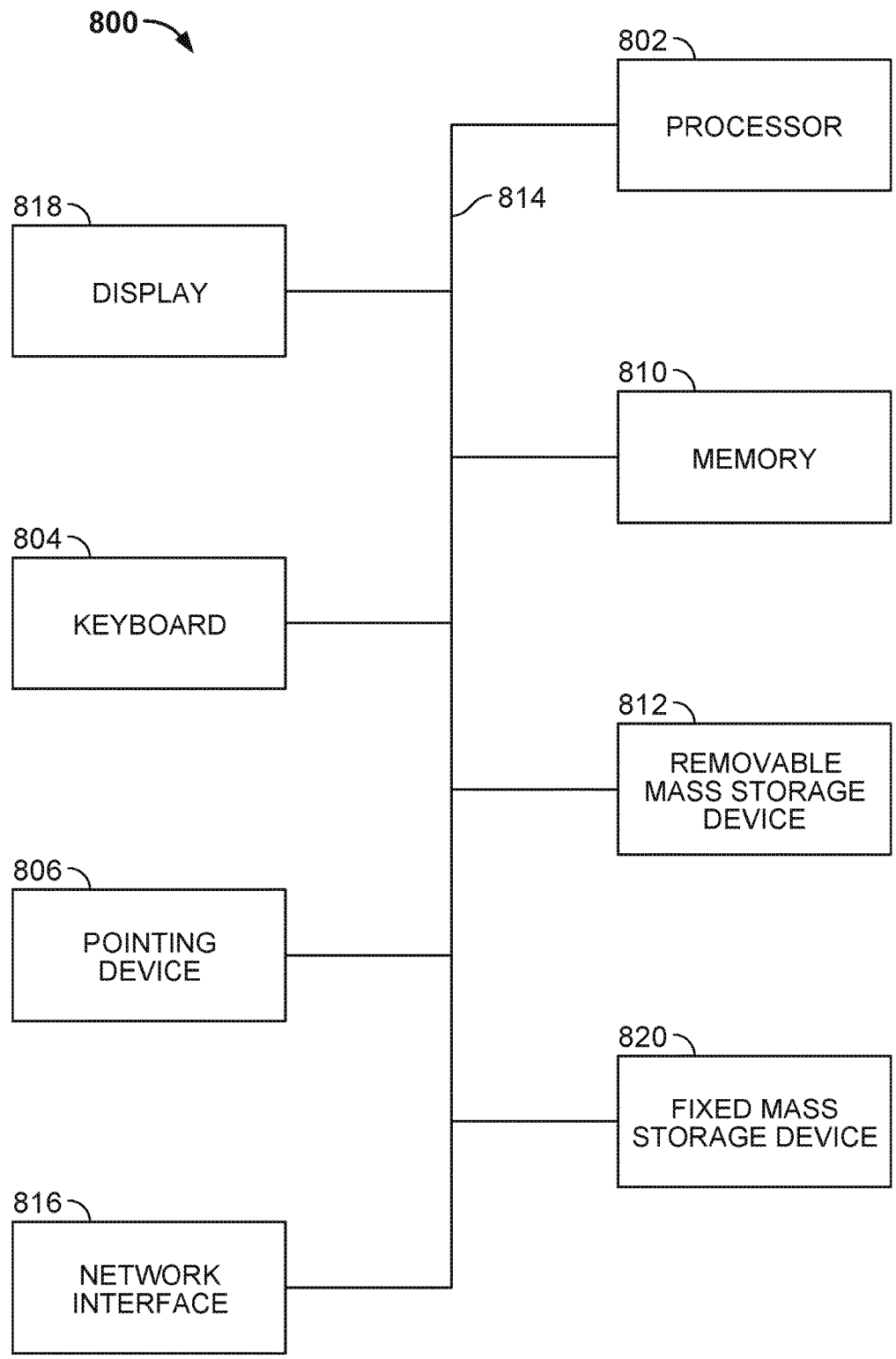
FIG. 8 is a functional diagram of an embodiment of a programmed computer system for recognizing information.

FIG. 8 is a functional diagram of an embodiment of a programmed computer system for recognizing information. As will be apparent, other computer system architectures and configurations can be used to recognize information. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (for example, display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (for example, programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage 812, 820 generally store additional programming instructions, data, and the like that typically are not in active use by the processor 802. It will be appreciated that the information retained within mass storage 812 and 820 can be incorporated, if needed, in standard fashion as part of memory 810 (for example, RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (for example, data objects or program instructions) from another network or output information to another network in the course of performing method/process steps. Information, often represented as a sequence of instructions to be executed on a processor, can be received from and outputted to another network. An interface card or similar device and appropriate software implemented by (for example, executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for recognizing information, comprising:
   locating, using a processor, at least one card zone for each frame within a card image frame sequence comprising a plurality of frames;
   locating, using the processor, at least one information zone within each card zone of the at least one card zone;
   dividing, using the processor, the at least one information zone into a plurality of character zones, the plurality of character zones including a first character zone and a second character zone, the first character zone and the second character zone corresponding to different positions within the at least one information zone;
   de-blurring, using the processor, the first character zone and the second character zone, comprising:
      for first character zones of the plurality of character zones corresponding to a first same region across the plurality of frames in the card image frame sequence:
         calculating clarities of the first character zones, wherein a clarity of a character zone is calculated by:
            determining intensity values of a plurality of pixels in the character zone based on horizontal gradient features and vertical gradient features of the plurality of pixels, comprising:
               determining an arrangement of matrix elements of a matrix corresponding to an arrangement of the plurality of pixels; and
               summing values of the matrix elements of the matrix in a direction to obtain the intensity values of the plurality of pixels, the direction being horizontal or vertical; and
            determining the clarity of the character zone based on intensity values of the plurality of pixels in the character zone, wherein the determining of the clarity of the character zone comprises:
               calculating a mean of the intensity values of the plurality of pixels in the character zone; and
               determining the mean of the intensity values as the clarity of the character zone; and
         identifying, as a first candidate character zone, a first character zone having a highest clarity;
      determining whether the first candidate character zone of a first image satisfies a predetermined threshold;
      in response to a determination that the first candidate character zone satisfies a predetermined threshold, selecting the first image as the selected image for subsequent recognition processing;
      for second character zones of the plurality of character zones corresponding to a second same region across the plurality of frames in the card image frame sequence:
         calculating clarities of the second character zones; and
         identifying, as a second candidate character zone, a second character zone having a highest clarity;
      in response to a determination that the second candidate character zone of the first image fails to satisfy the predetermined threshold:
         acquiring a next card image frame sequence to de-blur the second character zone; and
   recognizing, using the processor, character string information based on the de-blurred first candidate character zone and the de-blurred second candidate character zone.

2. The method as described in claim 1, further comprising:
   prior to the locating of the at least one card zone for the each frame within the card image frame sequence:
      storing, in a cache, a video stream or a plurality of single-frame images taken of a card face; and
      acquiring the card image frame sequence from the cache.

3. The method as described in claim 2, further comprising:
   prior to the locating of the at least one card zone for each frame within the card image frame sequence:
      storing, in a cache, a video stream or a plurality of single-frame images taken of a card face; and
      acquiring the card image frame sequence from the cache, comprising:
         selecting, from the video stream or the plurality of single-frame images in the cache, various frames in the card image frame sequence at intervals of a predetermined number of frames.

4. The method as described in claim 1, further comprising:
   verifying whether the character string information complies with a predetermined rule for a card;
   in the event that the character string information complies with the predetermined rule, displaying the character string information as card information to a user to be used in confirmation; and
   in the event that the character string information does not comply with the predetermined rule, acquiring a next card image frame sequence to be recognized.

5. The method as described in claim 1, wherein the next card image frame sequence is different from the card image frame sequence.

6. A system for recognizing information, comprising:
   at least one processor configured to:
      locate at least one card zone for each frame within a card image frame sequence comprising a plurality of frames;
      locate at least one information zone within each card zone of the at least one card zone;
      divide each information zone of the at least one information zone into a plurality of character zones, the plurality of character zones including a first character zone and a second character zone, the first character zone and the second character zone corresponding to different positions within the at least one information zone;
      de-blur the first character zone and the second character zone, comprising to:

for first character zones of the plurality of character zones corresponding to a first same region across the plurality of frames in the card image frame sequence:
calculate clarities of the first character zones, wherein a clarity of a character zone is calculated by:
determining intensity values of a plurality of pixels in the character zone based on horizontal gradient features and vertical gradient features of the plurality of pixels, comprising:
determining an arrangement of matrix elements of a matrix corresponding to an arrangement of the plurality of pixels; and
summing values of the matrix elements of the matrix in a direction to obtain the intensity values of the plurality of pixels, the direction being horizontal or vertical; and
determining the clarity of the character zone based on intensity values of the plurality of pixels in the character zone, wherein the determining of the clarity of the character zone comprises:
calculating a mean of the intensity values of the plurality of pixels in the character zone; and
determining the mean of the intensity values as the clarity of the character zone; and
identify, as a first candidate character zone, a first character zone having a highest clarity;
determine whether the first candidate character zone of a first image satisfies a predetermined threshold;
in response to a determination that the first candidate character zone satisfies a predetermined threshold, regard the first image as the selected image for subsequent recognition processing;
for second character zones of the plurality of character zones corresponding to a second same region across the plurality of frames in the card image frame sequence:
calculate clarities of the second character zones; and
identify, as a second candidate character zone, a second character zone having a highest clarity;
in response to a determination that the second candidate character zone of the first image fails to satisfy the predetermined threshold:
acquire a next card image frame sequence to de-blur the second character zone; and
recognize character string information based on the de-blurred first candidate character zone and the de-blurred second candidate character zone; and
a memory coupled to the at least one processor and configured to provide the at least one processor with instructions.

7. The system as described in claim 6, wherein the at least one processor is further configured to:
prior to the locating of the at least one card zone for the each frame within the card image frame sequence:
store, in a cache, a video stream or a plurality of single-frame images taken of a card face; and
acquire the card image frame sequence from the cache.

8. The system as described in claim 6, wherein:
the at least one processor is further configured to:
prior to the locating of the at least one card zone for each frame within the card image frame sequence:
store, in a cache, a video stream or a plurality of single-frame images taken of a card face; and
acquire the card image frame sequence from the cache, comprising to:
select, from the video stream or the plurality of single-frame images in the cache, various frames in the card image frame sequence at intervals of a predetermined number of frames.

9. The system as described in claim 6, wherein the at least one processor is further configured to:
verify whether the character string information complies with a predetermined rule for a card;
in the event that the character string information complies with the predetermined rule, display the character string information as card information to a user to be used in confirmation; and
in the event that the character string information does not comply with the predetermined rule, acquire a next card image frame sequence to be recognized.

10. A system for recognizing information, comprising:
a processor; and
a memory coupled with the processor, wherein the memory is configured to provide the processor with instructions which when executed cause the processor to:
acquire a card image frame sequence comprising a plurality of frames;
locate at least one card zone for each frame within a card image frame sequence;
locate at least one information zone within each card zone of the at least one card zone;
divide each information zone of the at least one information zone into a plurality of character zones, the plurality of character zones including a first character zone and a second character zone, the first character zone and the second character zone corresponding to different positions within the at least one information zone;
de-blur the first character zone and the second character zone, comprising to:
for first character zones of the plurality of character zones corresponding to a first same region across the plurality of frames in the card image frame sequence:
calculate clarities of the first character zones, wherein a clarity of a character zone is calculated by:
determining intensity values of a plurality of pixels in the character zone based on horizontal gradient features and vertical gradient features of the plurality of pixels, comprising to:
determine an arrangement of matrix elements of a matrix corresponding to an arrangement of the plurality of pixels; and
sum values of the matrix elements of the matrix in a direction to obtain the intensity values of the plurality of pixels, the direction being horizontal or vertical; and
determining the clarity of the character zone based on intensity values of the plurality of pixels in the character zone, wherein the determining of the clarity of the character zone comprises:
calculating a mean of the intensity values of the plurality of pixels in the character zone; and
determining the mean of the intensity values as the clarity of the character zone; and identify, as a first candidate character zone, a first character zone having a highest clarity;
determine whether the first candidate character zone of a first image satisfies a predetermined threshold;
in response to a determination that the first candidate character zone satisfies a predetermined threshold, select the first image as the selected image for subsequent recognition processing;
for second character zones of the plurality of character zones corresponding to a second same region across the plurality of frames in the card image frame sequence:
calculate clarities of the second character zones; and
identify, as a second candidate character zone, a second character zone having a highest clarity;
in response to a determination that the second candidate character zone of the first image fails to satisfy the predetermined threshold:
acquire a next card image frame sequence to de-blur the second character zone; and
recognize character string information based on the de-blurred first candidate character zone and the de-blurred second candidate character zone; and
display the recognized character string information.

11. The system as described in claim 10, wherein the processor is further configured to:
prior to the locating of the at least one card zone for the each frame within the card image frame sequence:
store, in a cache, a video stream or a plurality of single-frame images taken of a card face; and
acquire the card image frame sequence from the cache.

12. The system as described in claim 10, wherein:
the processor is further configured to:
prior to the locating of the at least one card zone for each frame within the card image frame sequence:
store, in a cache, a video stream or a plurality of single-frame images taken of a card face; and
acquire the card image frame sequence from the cache, comprising to:
select, from the video stream or the plurality of single-frame images in the cache, various frames in the card image frame sequence at intervals of a predetermined number of frames.

13. The system as described in claim 10, wherein the processor is further configured to:
verify whether the character string information complies with a predetermined rule for a card;
in the event that the character string information complies with the predetermined rule, display the character string information as card information to a user to be used in confirmation; and
in the event that the character string information does not comply with the predetermined rule, acquire a next card image frame sequence to be recognized.

14. A computer program product for recognizing information, the computer program product being embodied in a tangible non-transitory computer readable storage medium and comprising computer instructions for:
locating at least one card zone for each frame within a card image frame sequence comprising a plurality of frames;
locating at least one information zone within each card zone of the at least one card zone;
dividing each information zone of the at least one information zone into a plurality of character zones, the plurality of character zones including a first character zone and a second character zone, the first character zone and the second character zone corresponding to different positions within the at least one information zone;
de-blurring the first character zone and the second character zone, comprising:
for first character zones of the plurality of character zones corresponding to a first same region across the plurality of frames in the card image frame sequence:
calculating clarities of the first character zones, wherein a clarity of a character zone is calculated by:
determining intensity values of a plurality of pixels in the character zone based on horizontal gradient features and vertical gradient features of the plurality of pixels, comprising:
determining an arrangement of matrix elements of a matrix corresponding to an arrangement of the plurality of pixels; and
summing values of the matrix elements of the matrix in a direction to obtain the intensity values of the plurality of pixels, the direction being horizontal or vertical; and
determining the clarity of the character zone based on intensity values of the plurality of pixels in the character zone, wherein the determining of the clarity of the character zone comprises:
calculating a mean of the intensity values of the plurality of pixels in the character zone; and
determining the mean of the intensity values as the clarity of the character zone; and
identifying, as a first candidate character zone, a first character zone having a highest clarity;
determining whether the first candidate character zone of a first image satisfies a predetermined threshold;
in response to a determination that the first candidate character zone satisfies a predetermined threshold, selecting the first image as the selected image for subsequent recognition processing;
for second character zones of the plurality of character zones corresponding to a second same region across the plurality of frames in the card image frame sequence:
calculating clarities of the second character zones; and
identifying, as a second candidate character zone, a second character zone having a highest clarity;
in response to a determination that the second candidate character zone of the first image fails to satisfy the predetermined threshold:
acquiring a next card image frame sequence to de-blur the second character zone; and
recognizing character string information based on the de-blurred first candidate character zone and the de-blurred second candidate character zone.

* * * * *